United States Patent [19]
Nakamura

[11] Patent Number: 5,531,013
[45] Date of Patent: Jul. 2, 1996

[54] METHOD OF AND APPARATUS FOR ASSEMBLING WORK UNIT

[75] Inventor: Jun Nakamura, Hiroshima, Japan

[73] Assignee: Mazda Motor Corporation, Hiroshima-ken, Japan

[21] Appl. No.: 266,772

[22] Filed: Jun. 28, 1994

[30] Foreign Application Priority Data

Jun. 28, 1993 [JP] Japan .................................. 5-157691
Jun. 15, 1994 [JP] Japan .................................. 6-132887

[51] Int. Cl.$^6$ ................................................. B23P 11/00
[52] U.S. Cl. ................ 29/436; 29/890.124; 137/625.69; 251/63.5
[58] Field of Search .................... 137/625.69, 15, 137/315; 251/63.5; 29/890.124, 436

[56] References Cited

U.S. PATENT DOCUMENTS

| | | | |
|---|---|---|---|
| 3,960,166 | 6/1976 | Linser | 137/625.69 |
| 4,009,864 | 3/1977 | Schexnayder | 137/625.69 |
| 4,217,934 | 8/1980 | Peters | 137/625.69 |
| 4,611,632 | 9/1986 | Kolchinsky et al. | 137/625.69 |
| 4,673,162 | 6/1987 | Lachmann | 251/63.5 |
| 5,036,886 | 8/1991 | Olsen et al. | 137/625.69 |
| 5,295,512 | 3/1994 | Adams | 137/625.69 |

FOREIGN PATENT DOCUMENTS

| | | | |
|---|---|---|---|
| 5002973 | 10/1969 | Germany | 137/625.69 |
| 3-26432 | .6/1989 | Japan . | |

*Primary Examiner*—S. Thomas Hughes
*Assistant Examiner*—Marc W. Butler
*Attorney, Agent, or Firm*—Keck, Mahin & Cate

[57] ABSTRACT

A valve body unit is automatically assembled by inserting a cylindrical guide bush into an entry bore section of an axial bore of a valve body. The largest diameter of the valve spool is coaxially aligned with the guide bush. The valve spool is forced into the guide bush and then into the valve body.

9 Claims, 11 Drawing Sheets

METHOD OF AND APPARATUS FOR ASSEMBLING WORK UNIT

BACKGROUND OF THE INVENTION

1. Field of the Invention

The present invention relates to a method of and an apparatus for assembling mechanical units having a body with a plunger-like rod. More particularly, this invention concerns both a mechanical unit assembling method for assembling a plunger-like rod and a body in which the plunger-like rod slides so as to provide a mechanical unit. This invention also concerns an apparatus for assembling the mechanical unit.

2. Description of Related Art

A mechanical unit having a body and a reciprocal plunger-like rod installed for sliding movement in the body conventionally includes hydraulic control valve units. Each of the control valve units includes a valve body and a spool as a reciprocal plunger-like rod and typically forms an important element of a hydraulic control circuit of an automatic transmission for automotive vehicles. The valve body is typically formed with an axial valve bore including a plurality of coaxial cylindrical bore sections having different inner diameters and coaxially arranged continuously along the axial length of the valve bore. The valve spool is correspondingly configured from a plurality of coaxial cylindrical spool sections having different outer diameters and coaxially arranged continuously along the axial length.

Because of the different diameters of the coaxial cylindrical bore and spool sections and because the accuracy with which the valve spool is fitted into the valve body needs to be sufficient to provide an oil-tight fit between the valve spool and the valve body, it is typical to assemble the hydraulic control valve unit manually. This is because it is quite hard to automate the assembly of the control valve unit. As an easy way to insert the valve spool into the valve body, the valve spool is forced into the valve body after having chamfered the leading edge of the spool so that it is in accord with the valve bore section. Further, if a strong thrust force is applied to the valved spool, it causes wall surfaces of both the valve spool and valve bore and, therefore, the valve body to be vibrated vertically during insertion of the valve spool.

Figure 9:
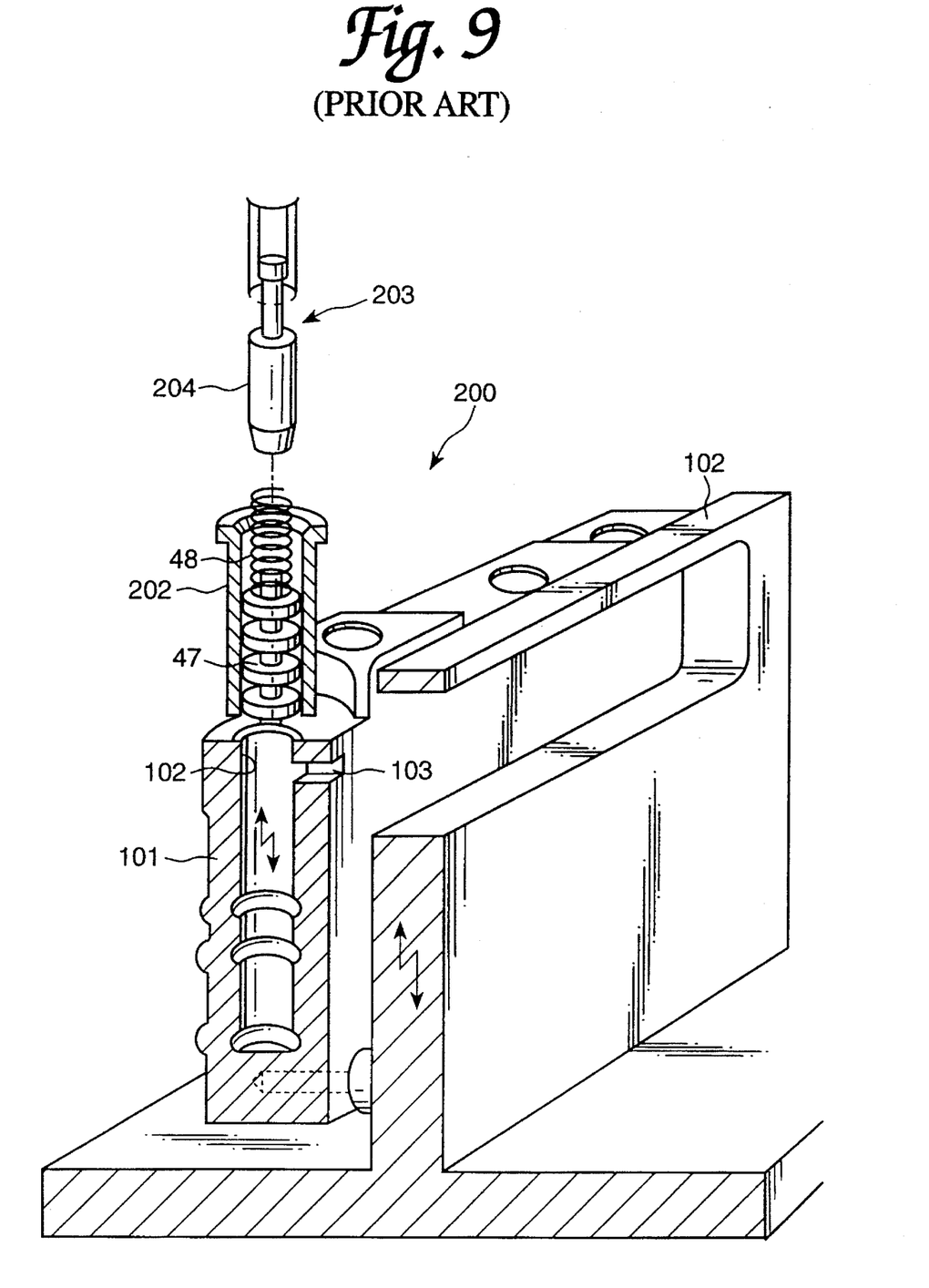
FIGS. 9 to 11 are schematic perspective illustrations showing a conventional automatic valve assembling apparatus.
Figure 10:
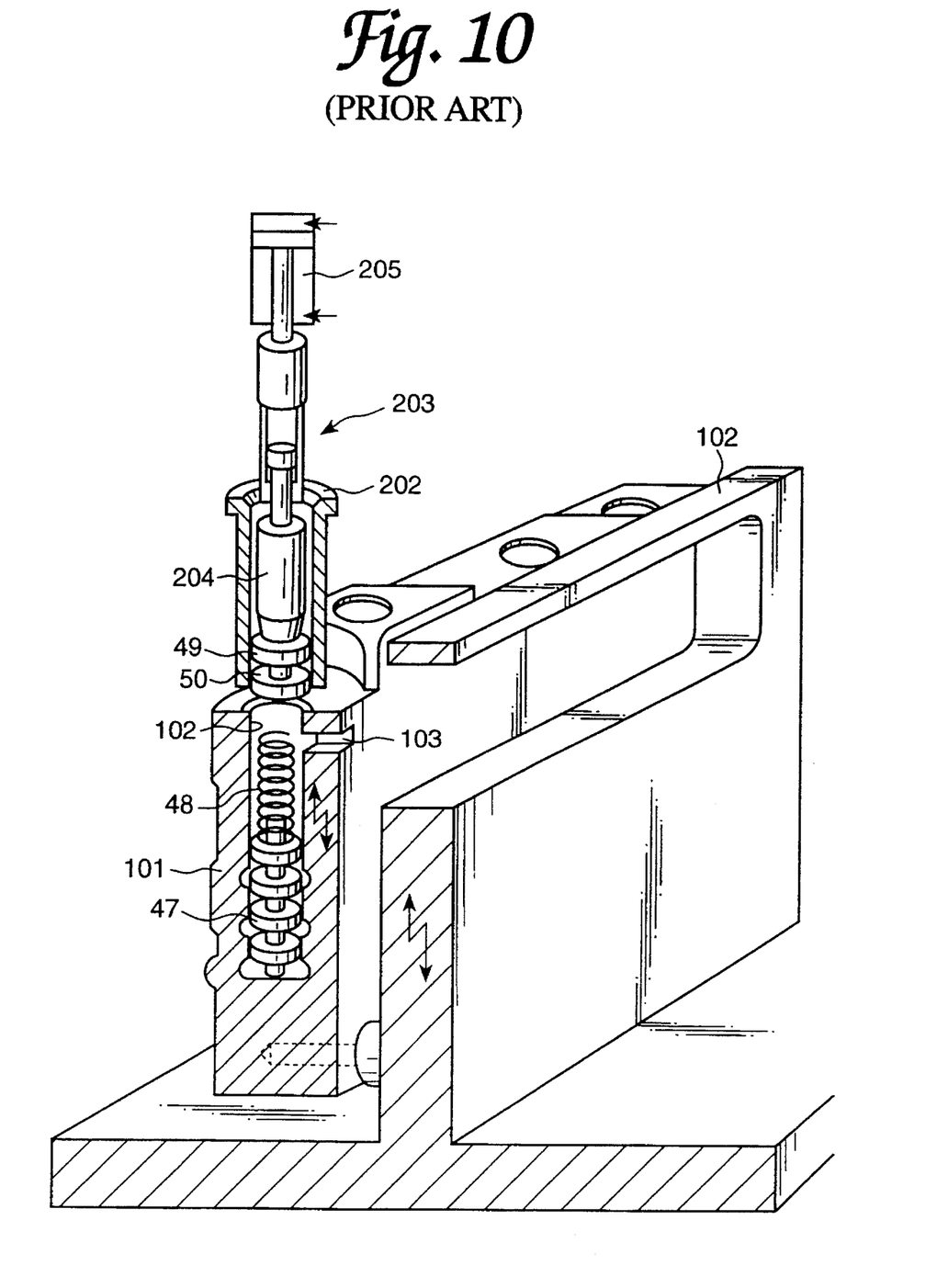
Figure 11:
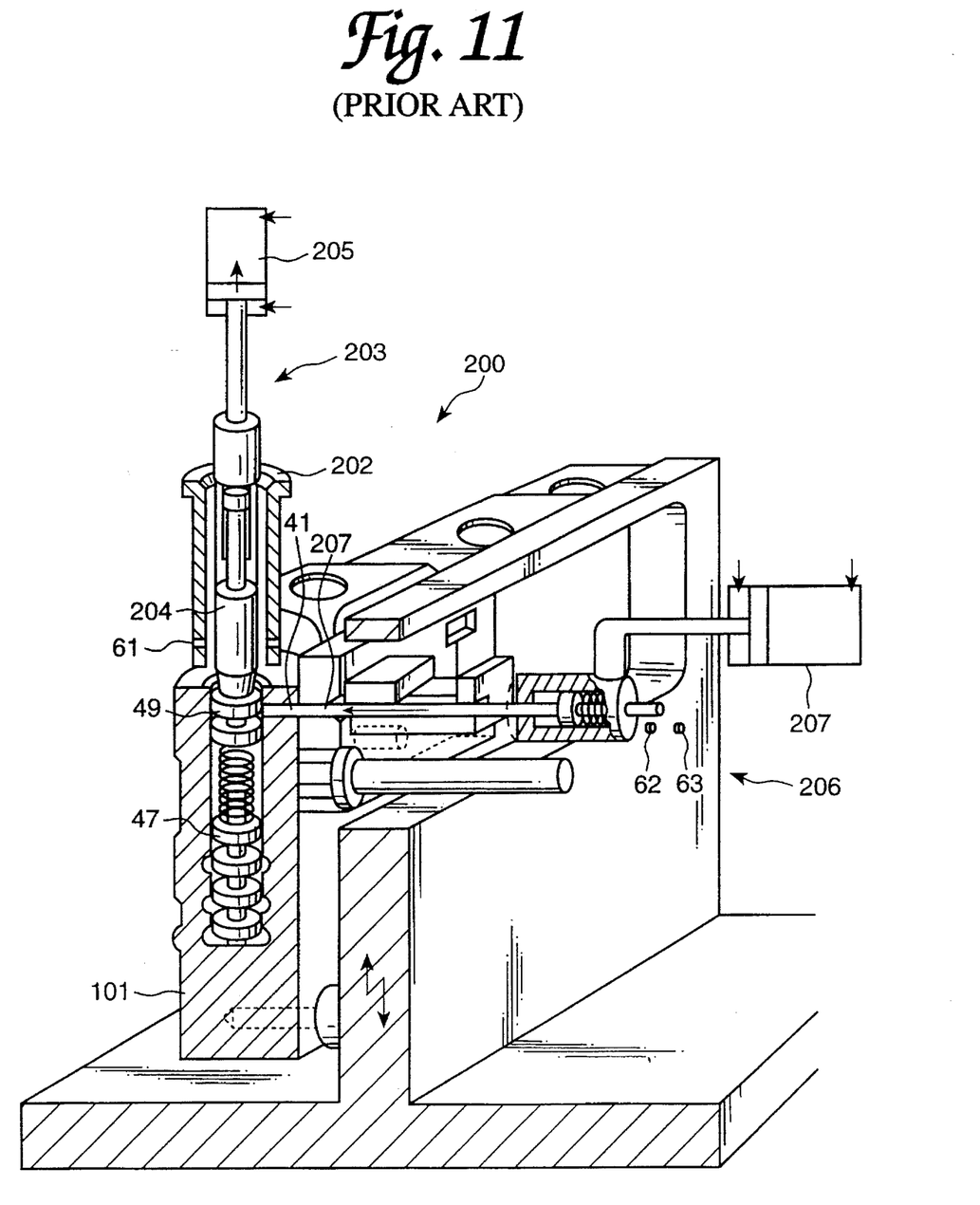

For the purpose of providing a brief description of a conventional automatic valve unit assembling apparatus that will enhance an understanding of the method of and apparatus for automatically assembling hydraulic control valve units of the present invention, reference is made to FIGS. 9 to 11.

In FIGS. 9 to 11, a known automatic valve unit assembling apparatus, as described in Japanese Unexamined Patent Publication No. 3-26432, is schematically illustrated. The apparatus is used to assemble a valve unit 100. This valve unit 100 consists of a valve body 101, a valve spool 47, a coil spring 48 and a plug 49. Specifically, the valve spool 47 and coil spring 48 are inserted into a valve bore 102 of the valve body 101, in order, and then, the open end of the valve body 101 is stopped up by the plug 49. In order to retain the plug 45 in position, a retainer pin 41 is fitted into a retainer bore 103 so that it radially extends in the wall of the valve body 101 and a retainer groove 50 formed in the plug 49. An automatic valve unit assembling apparatus 200 includes a pallet 201 which supports the valve body 101 and moves and positions it at a predetermined assembling station. At the assembling station, after having introduced the spool 47, coil spring 48 and plug 49 into a guide tube 202 by a part feeding and handling device, a shoving device 203, including a floating weight head 204 connected to a cylinder 205, is activated to shove the plug 49 against the coil spring 48 downward until the retainer bore 40 and retainer groove 34 are aligned with each other. While the floating weight head 204 presses the plug 49 down, a retainer insertion device 206, including a cylinder 207, is moved in close proximity to the valve body 101 and inserts a retainer pin 41 into the retainer bore 103 and retainer groove 50 by means of a retainer push rod 207. In order to detect proper insertion of the spool 47, coil spring 48 and spring 49 into the valve body 101 through the guide tube 202, a sensor 61 is provided in connection with the guide tube 202. In addition, a pair of sensors 62 and 63 are provided in connection with the retainer feeder device 206 in order to detect that the retainer pin 41 is in position before and after inserting the retainer pin 41 for detecting proper insertion of the retainer pin 41.

This automatic valve unit assembling apparatus 200 is not readily available for use in connection with valve units in which valve bodies have valve bores comprised of pluralities of different diameters of bore sections and valve spools comprised of pluralities of different diameters of bore sections. Such a valve unit is typically assembled in such a way as to initiate the insertion of a spool into a valve body while bringing the spool into coaxial alignment with the valve bore and then manually inserting the spool while manually keeping coaxial alignment between the spool and valve bore. Accordingly, an important improvement in the valve industry would be in automation so as to provide automatic assembling of valve units with less man power required to perform the necessary work.

SUMMARY OF THE INVENTION

It is an object of the present invention to provide a method of and an apparatus for assembling mechanical units having a body with a plunger-like rod and, more particularly, to a mechanical unit assembling method of assembling a plunger-like rod into a body in which the plunger-like rod slides so as to provide a mechanical unit. It is a further object to provide an apparatus for assembling the mechanical unit.

In order to achieve the above objects, a plunger-like cylindrical rod, such as a valve spool, having a plurality of cylindrical sections with different outer diameters is assembled into a body, such as a valve body, formed with an axial bore. The axial bore includes a plurality of cylindrical bore sections with different inner diameters and are arranged coaxially and in order of diameter. The method of assembling the complete mechanical unit includes the steps of inserting a cylindrical guide bush, having an outer diameter approximately equal to the largest inner diameter of the cylindrical bore section and an inner diameter approximately equal to the second largest diameter of the cylindrical bore section, into the largest diameter of the cylindrical bore section, coaxially aligning the largest diameter of the cylindrical section of the plunger-like rod with the cylindrical guide bush, and thereafter forcing the plunger-like rod into the guide bush and then into the body. After removing the cylindrical guide bush from the body, the axial bore is closed by a valve cap. Before inserting the guide bush into the body, a guide shoe, formed with a spherically chamfered inner edge, is placed on the top of the body.

The guide bush is inserted into the largest bore section and forms a straight bore section, having the same diameter as the second largest bore section diameter, extending to the entry end of the valve body. In other words, a shoulder between the largest and second largest diameters of bore sections is substantially eliminated. Consequently, the plunger-like rod can be easily aligned with the axial bore of the body and, accordingly, easily and smoothly inserted into the axial bore of the body. Further, the spherically chamfered inner edge functions to bring the guide bush into alignment with the largest diameter bore section and the guide bush can be smoothly inserted into the axial bore of the body. The utilization of the guide bush and guide shoe makes it quite easy to automate the assembling of the mechanical unit.

While the plunger-like rod is forced and inserted into the guide bush and then the axial bore of the body, a thrust force with which the plunger-like rod is forced is monitored so as to correctively perform coaxial alignment of the plunger-like rod and, in particular, align the largest diameter of the cylindrical section with the cylindrical guide bush or the axial bore when the thrust force is larger than a predetermined value. A thrust force larger than the predetermined value indicates interference between the largest diameter of the cylindrical section and the cylindrical guide bush or the axial bore. This repetitive coaxial alignment makes it quite easy to automate assembling of the mechanical unit even for a mechanical unit having a plunger-like rod which is likely to be brought out of coaxial alignment with the guide bush and the axial bore while being inserted. Establishing of a predetermined value which is larger while the plunger-like rod is forced into the guide bush than while the plunger-like rod is forced into the body provides an improvement in precise control of insertion of the plunger-like rod into the guide bush and into the body during automatically assembling the valve unit.

The apparatus for embodying the automatic assembling method includes a guide bush handling manipulator for handling and inserting a cylindrical guide bush, having an outer diameter approximately equal to the largest inner diameter of the cylindrical bore section and an inner diameter approximately equal to the second largest diameter of the cylindrical bore section, into the larger diameter of the cylindrical bore section before assembling the plunger-like rod into the body, and removing the cylindrical guide bush from the body after assembling the plunger-like rod into the body vertically supported by a supporting stand. A rod handling manipulator is used for forcing the plunger-like rod into the guide bush and then into the body so as to insert the plunger-like rod into the body.

A guide shoe, which is formed with a guide bore having an inner diameter approximately equal to the largest inner diameter of the cylindrical bore section, is placed right above the body so as to position the guide bush coaxially with the axial bore of the body. The inner peripheral edge of the guide shoe is spherically chamfered so as to bring the guide bush into coaxial alignment with the guide bore, and hence the second largest diameter of the cylindrical bore section of the axial bore, when the guide bush contacts the spherically chamfered edge. The utilization of the guide bush and guide shoe makes it quite easy to automate the coaxial alignment of the guide bush and the assembling of the mechanical unit.

BRIEF DESCRIPTION OF THE DRAWINGS

The above and other objects and features of the present invention will be clearly understood from the following description of a preferred embodiment thereof when considered in conjunction with the accompanying drawings, in which.

DETAILED DESCRIPTION OF THE PREFERRED EMBODIMENT

Figure 1A:
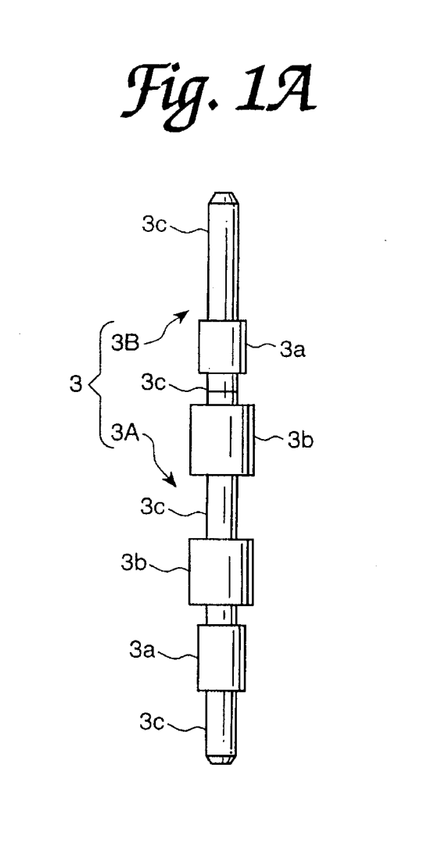
FIG. 1A is a plan view of a valve spool.
Figure 1B:
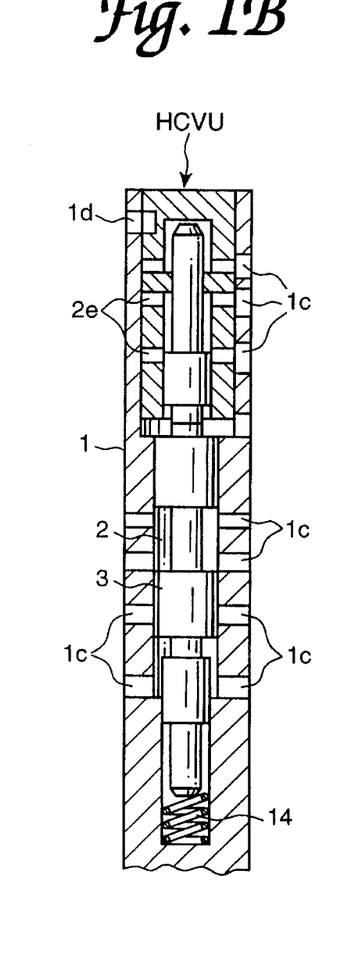
FIG. 1B is a longitudinal sectional view of a hydraulic control valve unit.

The following description is directed to a method of and an apparatus for assembling a hydraulic control valve unit HCVU, shown in FIGS. 1A to 1B, as a mechanical unit used in hydraulic control circuits for automatic transmissions of vehicles. This valve unit HCVU is configured by a generally cylindrically shaped valve body 1 as a body and a valve spool 3 as a plunger. The valve body 1 is divided into two valve body sections, namely, a main valve body 1A and a valve body cap 1B. As will be described later, the valve body cap 1B is assembled into the main valve body 1A so as to complete the entire valve body 1 having an axial valve bore 2 configured by a plurality of coaxial cylindrical bore sections, namely, a small diameter cylindrical valve guide bore section 2a, a large diameter cylindrical valve guide bore section 2b, larger in diameter of the small diameter valve guide bore section 2a, and a cylindrical stem guide bore section 2c, smaller in diameter than the small diameter valve guide bore section 2a. The sections 2a, 2b and 2c are coaxially arranged continuously. The main valve body 1A is further formed with a cylindrical fitting bore section 2d having a diameter larger than the large diameter bore section 2b, in addition to the medium diameter bore section 2a and large diameter bore section 2b. This fitting bore section 2d is coaxial with the axial valve bore 2 and opens to the exterior. The valve body cap 1B, having an outer diameter equal to the diameter of the fitting bore section 2d of the main valve body 1A so as to be oil-tightly fitted in the main valve body 1B, is formed with a small diameter cylindrical valve guide bore section 2a, which has the same diameter as that of the small diameter bore section 2b of the main valve body 1A, and a cylindrical stem guide bore section 2c.

Figure 1C:
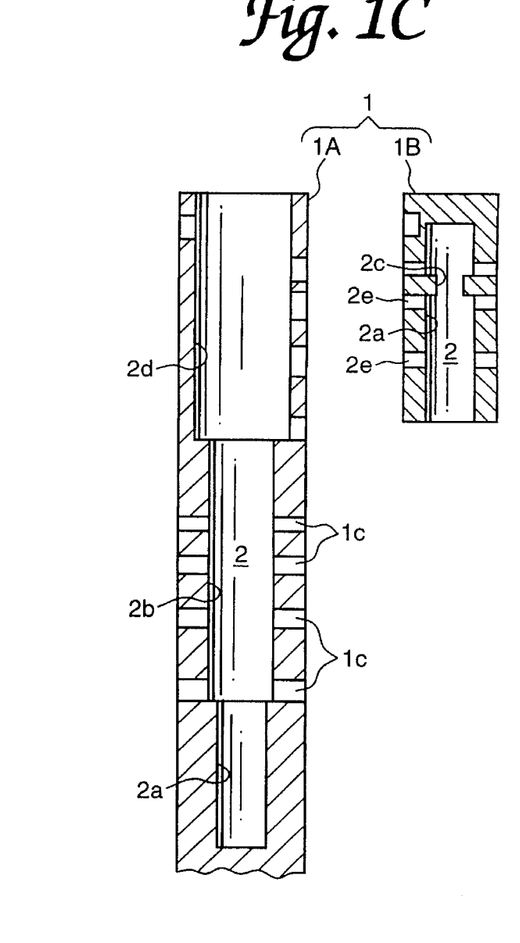
FIG. 1C is an exploded longitudinal sectional view of a valve body.

The valve spool 3 is divided into two spool sections, namely, a first half spool 3A and a second half spool 3B. The first half spool 3A is integrally configured by small diameter cylindrical spool sections 3a, large diameter cylindrical spool sections 3b and spool stems 3c. Similarly, the second half spool 3B is integrally configured by a small diameter spool section 3a and a spool stem 3c. These first and second half spools 3A and 3B are installed as a whole valve spool 3 within the valve body 1 for sliding movement and forced by means of a tension spring 14 in one direction or toward the valve body cap 1B. In this instance, at least the small and large diameter spool sections 3a and 3b are oil-tightly fitted in the valve guide bore sections 2a and 2b, respectively, and shift axially to open and close selectively a plurality of valve openings 1c and/or 2e formed radially in the wall of the valve body 1. The spool stem 3c of the second half spool 3B is fitted for smooth sliding movement in the stem guide bore section 2c.

Figure 2:
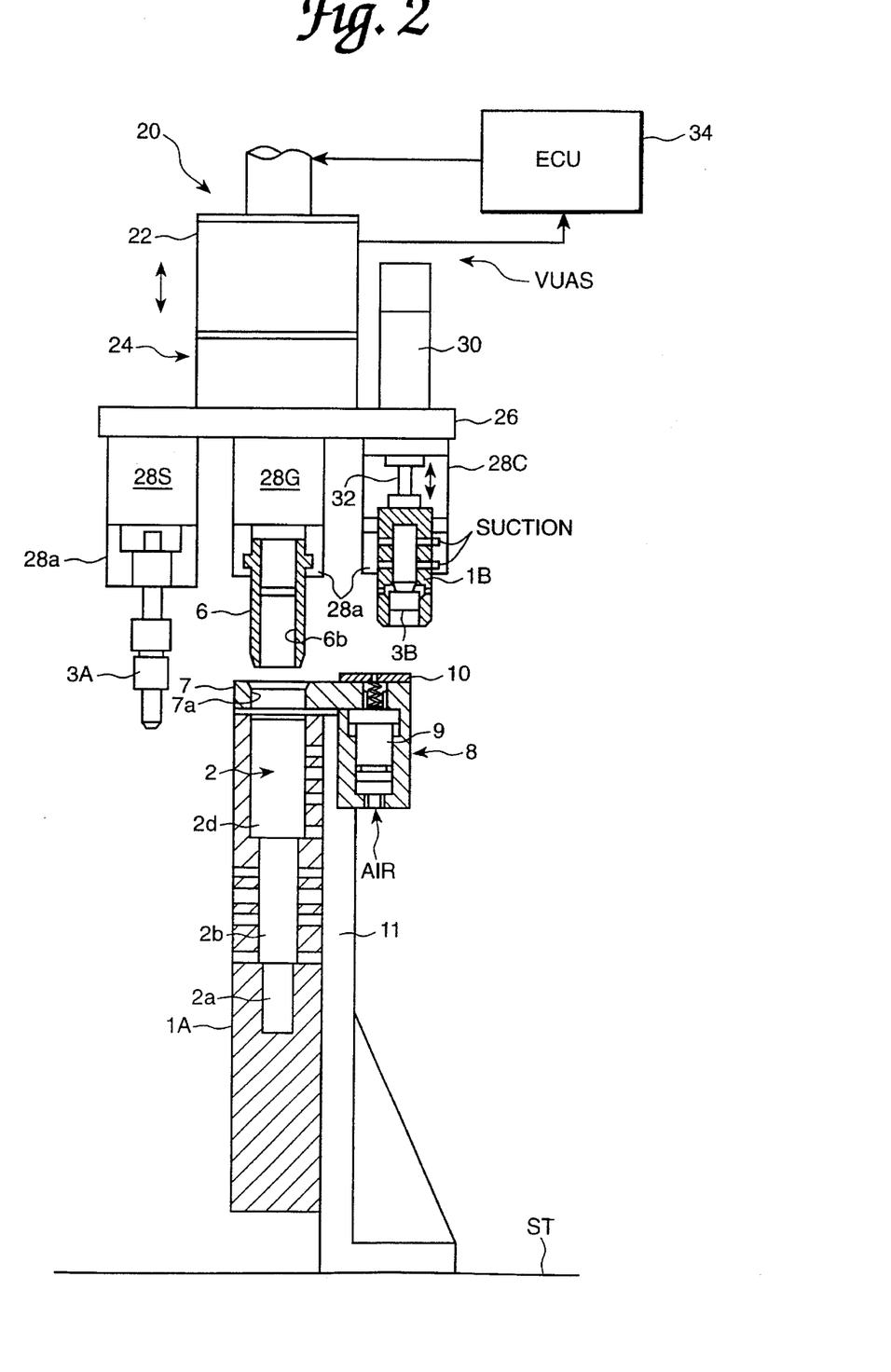
FIG. 2 is a front view of an assembling apparatus for the valve unit shown in FIG. 1B in accordance with a preferred embodiment of the present invention.
Figures 3, 4:
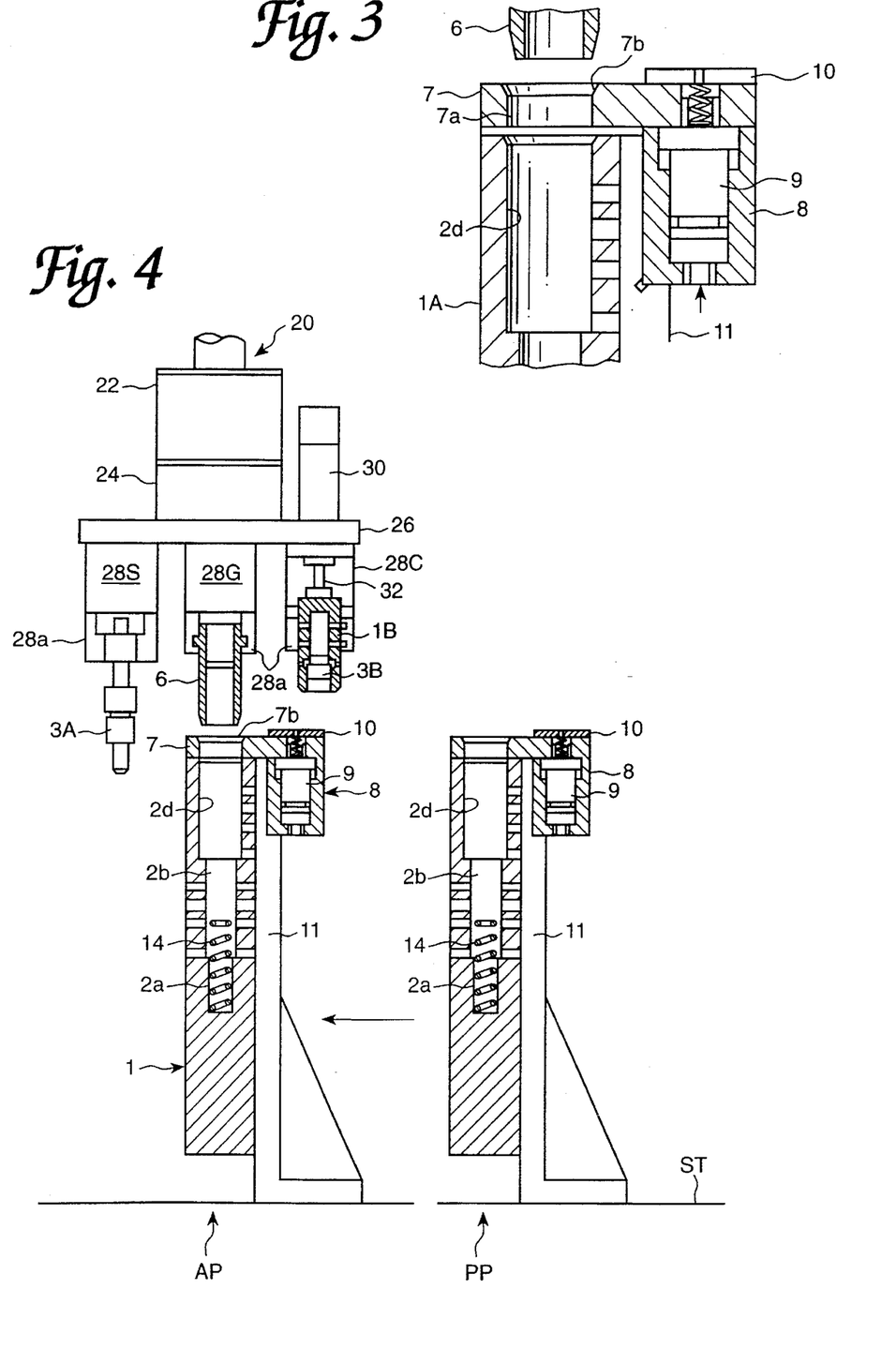
FIG. 3 is an enlarged sectional view of a part of the valve unit assembling apparatus.
FIG. 4 is a front view of the valve unit assembling apparatus showing a provisional assembling step.

Referring to FIGS. 2 and 3, an assembling apparatus such as, for instance, a valve unit assembling apparatus VUAA, in this embodiment, designed and adapted suitably to assemble the hydraulic valve unit HCVU shown in FIGS. 1A–1B, is shown. In assembling such a hydraulic control valve unit HCVU, the main valve body 1A is formed with the fitting bore section 2d as an introductory section, having a substantially larger diameter than the large diameter bore section 2b, in which the large diameter spool section 3b of the first half valve spool 3 slides, keeping surface contact with the wall surface of the large diameter valve bore section 2b. It is, hard, therefore, to insert the first half valve spool 3 into the valve bore 2 of the main valve body 1A while keeping coaxial alignment of the first half valve spool 3A and the valve bore 2 through, for instance, the guidance of the large diameter spool sections 3b by the inner surface of the large diameter bore section 2a.

In order to simplify the insertion of the first half valve spool 3A into the valve bore 2 of the main valve body 1A, a guide bush 6, formed with an annular flange 6a, is used for assembling purposes only to provide a provisional entry bore 6b having the same diameter as the large diameter bore section 2b. The guide bush 6 is configured so as to have an outer diameter approximately equal to both the diameter of the fitting bore section 2d and the outer diameter of the valve body cap 1B, and a bore diameter almost equal to the diameter of the large diameter bore section 2b. The guide bush 6 is fitted into the fitting bore section 2d of the valve bore 2 of main valve body 1A before insertion of the first half spool 3A. Because fitting of the foremost large diameter spool section 3b of first half valve spool 3A into the entry bore 6b of the guide bush 6 forms a straight wall between the entry bore 6b of guide bush 6 and the large diameter valve bore section 2b of main valve body 1A, it is quite easy to insert the first half valve spool 3A into the valve bore 2A of main valve body 1A with the center axis of the first half spool 3A in alignment with the center of the valve bore 2 of main valve body 1A.

In addition, in order to cope with contingent improper coaxial alignment between the guide bush 6 and the entry bore section 2d of main valve body 1A, often present due to rough finishing of the entry bore section 2d, a guide shoe 7 is placed stationary and directly on or almost in contact with the open end of the main valve body 1A before insertion of the guide bush 6. The guide shoe 7 has a precisely finished guide bore 7a with a diameter almost equal to that of the entry bore section 2d of main valve body 1A and an inner peripheral edge 7b which is spherically chamfered. Before the first half spool 3A is inserted into the main valve body 1A, the guide shoe 7 is aligned with the main valve body 1A so as to position its guide bore 7a precisely coaxial with the entry bore 2d of main valve body 1A.

The valve unit assembling apparatus VUAA includes a work retaining stand 11 positioned stationary on a shaking table ST and a guide shoe holder, such as an air cylinder 8, secured to the work retaining stand 11. When the air cylinder 8 is activated, its piston rod 9 is forced upward until reaching a vertical position at which a stationary guide shoe holder 10 is located. This piston rod 9 presses a tail end 7c of the guide shoe 7 against the stationary guide shoe holder 10 and holds the guide shoe at the intended vertical height so as to fixedly position the guide shoe 7 immediately above the open end of the main valve body 1A retained vertically by the work retaining stand 11.

The valve unit assembling apparatus VUAA further includes, as its major part, an assembling manipulator or robot hand 20 controlled, in operation, by means of an electronic control unit (ECU) 34. The robot hand 20 is provided with an inner force sensing unit or device 22 and a remote center compliance (RCC) device 24 joined to the inner force sensing device 22 through a floating joint mechanism. These inner force sensing devices, RCC devices and floating joint mechanisms are well known to those skilled in the robot art and may be of any well known type. The RCC device 24 has, at its bottom, a rotary disk 26 provided with three chucking arms 28 arranged at regular angular intervals of 120 degrees for chucking parts to be assembled to the main valve body 1A and its associated elements. In this instance, as will be described in detail later, when the robot hand 20 operates to insert the first half spool 3A into the valve bore 2 of main valve body 1A, the foremost large diameter spool section 3b of first half spool 3A likely abuts a chamfered inner edge C of a shoulder 2f between the large diameter bore section 2b and entry bore 2d or the wall surface of the large diameter bore section 2b. In such an event, the section 3b is subjected to a reactive force from the edge C. The inner force sensing device 22 senses and detects X-, Y- and Z-components of the reaction force, namely, reaction force components Fx, Fy and Fz, received by the first half spool 3A. The RCC device 24 has a specific value of compliance which is sufficiently small that it does not allow the large diameter spool section 3b of first half spool 3A to damage or harm the wall surface of the large diameter bore section 2b of the main valve body 1A during insertion of the first half spool 3A. The three chucking arms 28G, 28S and 28C grasp the first half spool 3A, the valve body cap 1B with the second half spool 3B previously installed therein, and the guide bush 6, by means of their fingers 28a, respectively. The rotary disk 26 is equipped with an air cylinder 30 having a piston rod 32 cooperating with the valve body cap chucking arm 28C assigned to the valve body cap 1B and pushing down the valve body cap 1B. The valve body cap chucking arm 28C, with fingers 28a assigned to the valve body cap 1B, is equipped with a suction pump (not shown) which is in communication with the interior of the valve body cap 1B through the valve openings 2e so as to aspirate the interior of the valve body cap 1B, thereby holding the second half spool 3B previously installed within the valve body cap 1B.

Referring to FIGS. 4 and 5A–5D, prior to assembling the valve spool 3 and the valve body cap 1B to the main valve body 1A and completing the hydraulic control valve unit HCVU, the work retainer stand 11, placed on and minutely vibrated vertically by the shaking table ST and holding the main valve body 1A, is placed in a preassembling position PP where a coil spring 14 is dropped into the small diameter bore section 2a. Then, the work retainer stand 11, holding the main valve body 1A with the coil spring 14 installed in the bottom of the valve bore 2, is moved into an assembling position AP right below the robot hand 20. At this time, the air cylinder 8 has not yet been activated, keeping the guide shoe 7 slightly apart away upward from the top of the main valve body 1A. On the other hand, the chucking arms 28S, 28G and 28C have previously held the first half spool 3A, the guide bush 6 and the valve body cap 1B with the second half spool 3B previously fitted therein, with their fingers 28a, respectively After placing the work retaining stand 11 right below the guide bush chucking arm 28G holding the guide bush 6 and turning slightly the rotary disk 26 so as to bring the guide bore 6b of guide bush 6 in alignment with the entry bore 2d of main valve body 1A, the air cylinder 8 is activated to cause its piston rod 9 to protrude so as to press the tail end 7c of guide shoe 7 against the guide shoe holder 10 and fixedly position it at the intended vertical height from the top of the main valve body 1A. As a result, the guide shoe 7 is fixed in position to align vertically its guide bore 7a with the guide bore 6b of guide bush 6.

Figure 5A:
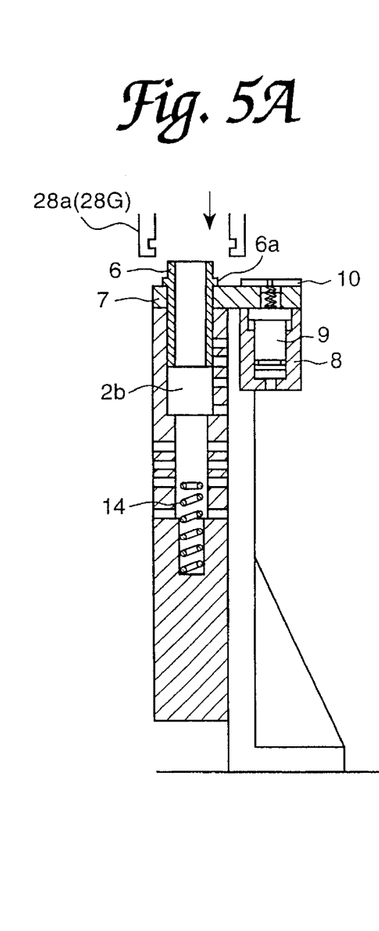
FIGS. 5A to 5D are explanatory illustrations showing various assembling steps.

Subsequently, the robot hand 20 moves downward so as to insert the guide bush 6 into the guide shoe 7 until the annular flange 6a of guide bush 6 abuts the top of the guide shoe 7 as shown in FIG. 5A. When the annular flange 6a of guide bush 6 abuts the top of the guide shoe 7, the major portion of the guide shoe 7 has been inserted into the entry bore 2d of the main valve body 1A. During this insertion, the guide shoe 7 causes alteration of a vertical incline of the guide bush 6 through engagement of the lower end of the guide bush 6 with the spherically chamfered edge 7b and keeps the guide bush 6 in coaxial alignment with the large diameter bore section 2b of the valve bore 2 of main valve body 1A and under the assistance of the floating joint mechanism. In addition, the shaking table ST applies minute vertical vibrations to the main valve body 1A so as to promote the insertion of the guide bush 6 into the guide shoe 7. By the aid of the guide shoe 7, the guide bush 6 is easily received in and coaxially aligned with the large diameter bore section 2b.

Figure 5B:
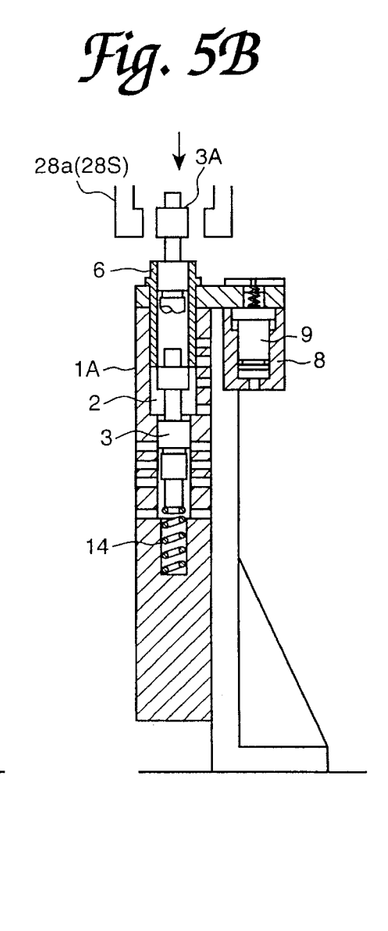

After the robot hand 20 has released the guide bush chucking arm 28G from the guide bush 6 and moved upward, it turns the rotary disk 26 until the first half spool 3A is brought right above the main valve body 1A. Then, the robot hand 20 moves downward so as to insert the foremost large diameter spool section 3b of first half spool 3A into the guide bush 6. When the foremost large diameter spool section 3b of first half spool 3A is fully fitted smoothly into the guide bush 6, the coaxial alignment is accurately organized among the guide bore 6b of guide bush 6, the large diameter bore section 2b of main valve body 1A and the large diameter spool sections 3b of first half spool 3A. As the robot hand 20 continuously moves downward, the large diameter spool sections 3b of first half spool 3A are inserted into the guide bush 6, one after another, keeping the coaxial alignment. Accordingly, while one of the large diameter spool sections 3b of first half spool 3A is still in the guide bush 6, the foremost large diameter spool section 3b reaches the large diameter bore section 2b and enters smoothly into it as shown in FIG. 5B. This insertion of the first half spool 3A is performed while controlling the thrust force applied to the first half spool 3A as will be described later. During the insertion, the shaking table ST continuously applies minute vertical vibrations to the main valve body 1A, so as to promote insertion of the guide bush 6 into the guide shoe 7. After at least one of the large diameter spool sections 3b of first half spool 3A has been inserted and held within the large diameter bore section 2b of main valve body 1A, the robot hand 20 releases the spool chucking arm 28S from the first half spool 3A and moves upward.

Figure 5C:
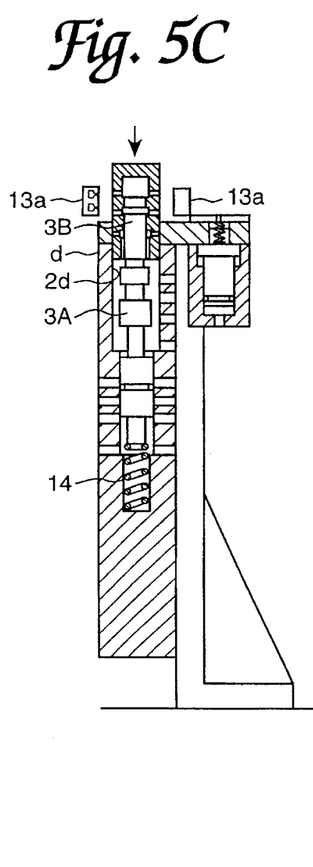
Figure 5D:
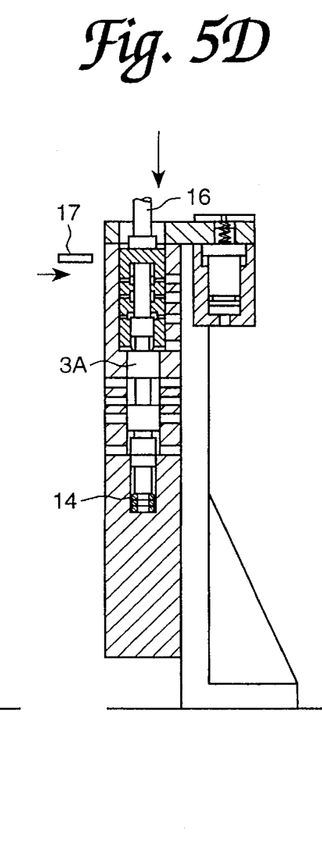

Subsequently, the robot hand 20 turns the rotary disk 26 until the guide bush chucking arm 28G is brought back right above the main valve body 1A. Then, the robot hand 20 moves downward and causes the guide bush chucking arm 28G to grasp the guide bush 6 and moves subsequently upward to pull it out of the main valve body 1A. The robot hand 20 again turns the rotary disk 26 until the cap chucking arm 28G is placed right above the main valve body 1A and, thereafter, moves downward so as to insert the valve body cap 1B into the entry bore 2d of main valve body 1A to a depth d through the guide shoe 7 as shown in FIG. 5C. Then, the robot hand 20 releases the cap chucking arm 28C from the valve body cap 1B and causes the suction pump to stop the suction inside the valve body cap 1B. At a result, the second half spool 3B falls down onto the first half spool 3A. Subsequently, the robot hand 20 causes the air cylinder 30 to protrude its piston rod 32 downward and press and insert the valve body cap 1B fully into the entry bore 2d until the valve body cap 1B abuts the shoulder 2f. While the air cylinder 30 holds down the valve body cap 1B within the main valve body 1A with its piston rod 32, a retaining pin 17 is fitted into openings 1d of the main valve body 1A and valve body cap 1B in alignment with each other so as to fix the main valve body 1A and valve body cap 1B together as an entire valve unit 1 as shown in FIG. 5D. Thereafter, the robot hand 20 moves upward and is prepared for assembling another hydraulic control valve unit HCVU.

Figure 6A:
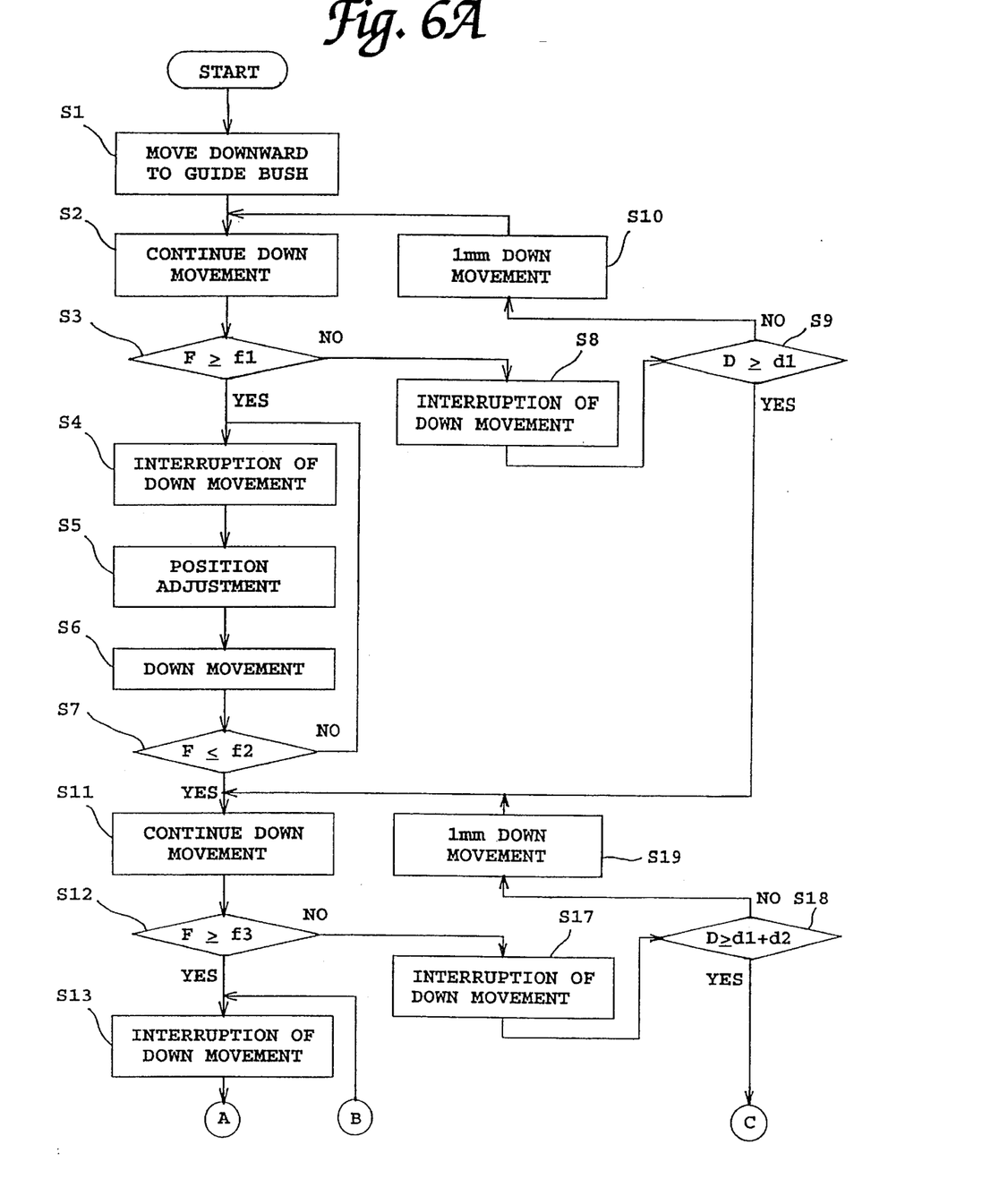
FIGS. 6A and 6B are flow charts illustrating a spool insertion control routine for a microcomputer incorporated in an electronic control unit (ECU)
Figure 6B:
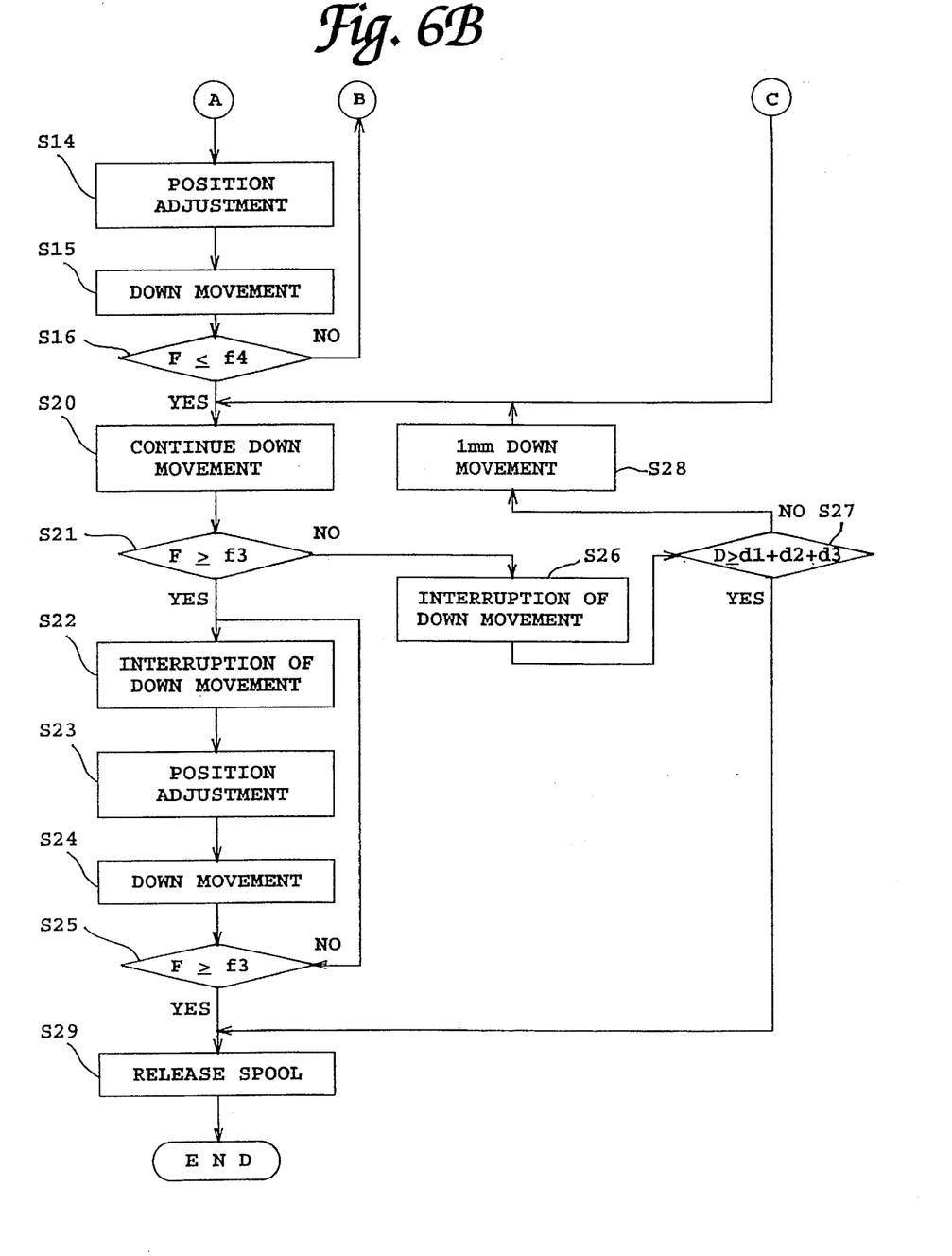
Figure 8:
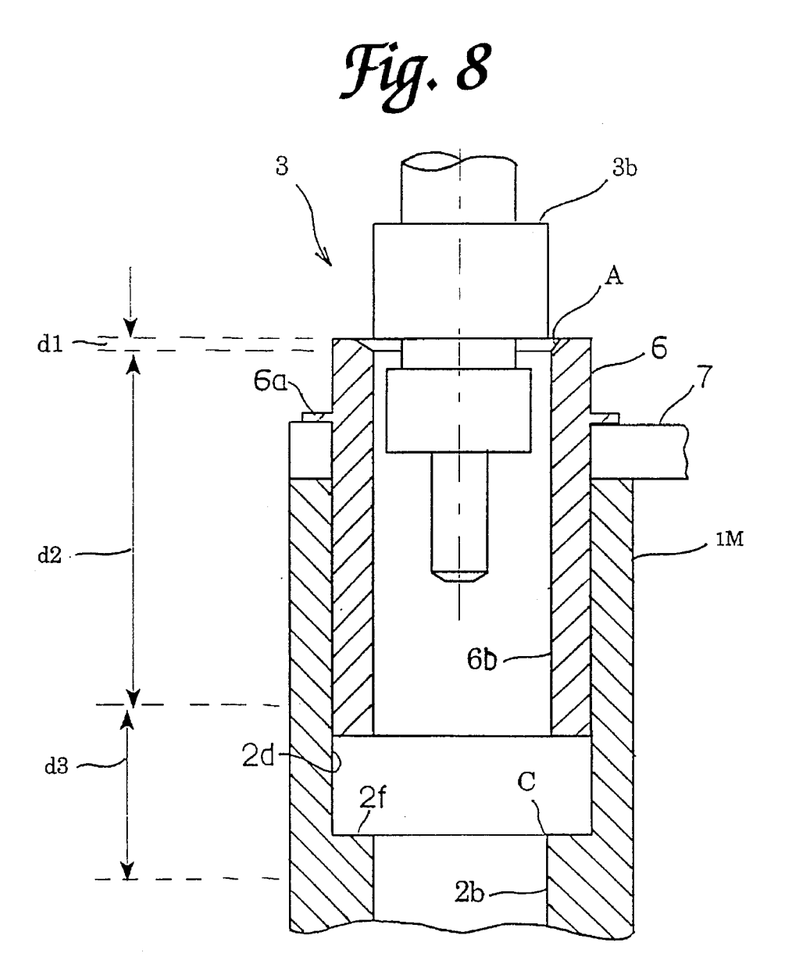
FIG. 8 is a detailed explanatory illustration showing the insertion of the spool into the guide bush and into the valve body.

The detailed operation of the robot hand 20 for the insertion of first half spool 3A into the main valve body 1A with controlled thrust force is best understood by reviewing FIGS. 6A and 6B in connection with FIG. 8, which is a flow chart illustrating a spool insertion control routine for a microcomputer incorporated in the electronic control unit (ECU) 34. Programming a computer is a skill well understood in the art. The following description is written to enable a programmer having ordinary skill in the art to prepare an appropriate program for the microcomputer. The particular details of any such program would, of course, depend upon the architecture of the particular computer selected.

Figure 7A:
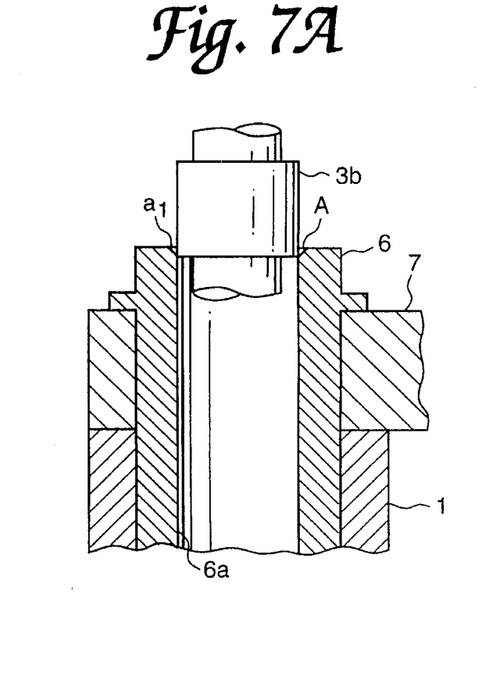
FIGS. 7A to 7C are explanatory illustrations showing various interferences of the spool.
Figure 7B:
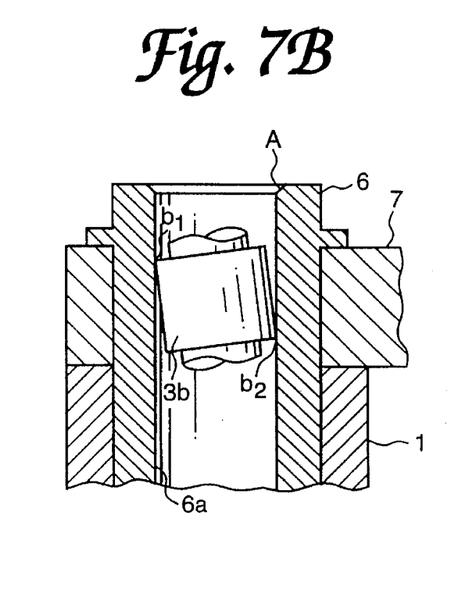
Figure 7C:
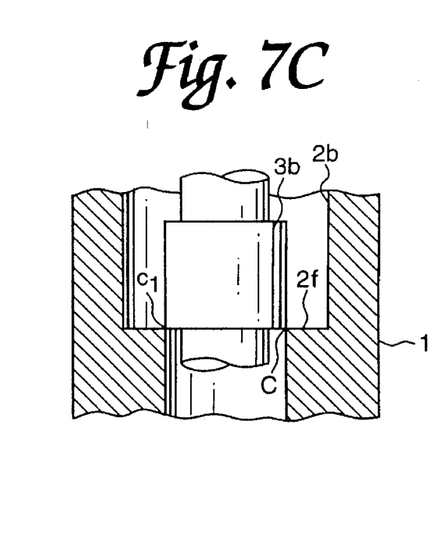

Before describing the operation of the robot hand 20 for the insertion of first half spool 3A into the main valve body 1A, reference is made to FIGS. 7A–7C for the purpose of providing some possible aspects of interference between the large diameter spool section 3b and the large diameter bore section 2b during insertion that will enhance an understanding of the operation of thrust force control. In the event that interference is caused between the leading edge of the foremost large diameter spool section 3b of first half spool 3A and the spherically chamfered edge A of the entry opening of the guide bush 6 at a point a1 as shown in FIG. 7A, the robot hand 20 is controlled by means of position adjustment operation so as to provide precise coaxial alignment between the first half spool 3A and the guide bush 6. Further, if the coaxial alignment is lost between the first half spool 3A and the guide bush 6 within the guide bush 6, the foremost large diameter spool section 3b is allowed to incline with respect to the guide bore 6b and contact or rub the wall surface of the guide bore 6b of guide bush 6 with upper and lower edges at points b1 and b2 as shown in FIG. 7B. The robot hand 20 is then controlled to perform a position adjustment operation for the first half spool 3A so as to restore the coaxial alignment between the valve bore 2 and the first half spool 3A. In addition, if interference is caused at a point c1 between the foremost large diameter spool section 3b of first half spool 3A and the inner edge C of the shoulder 2f between the large diameter bore section 2b and entry bore 2d as shown in FIG. 7C, the robot hand 20 is controlled by means of position adjustment operation to provide precisely coaxial alignment between the first half spool 3A and the large diameter bore section 2b.

The spool insertion control routine commences and control proceeds directly to step S1 in which the robot hand 20 is moved downward so as to bring the first half spool 3A toward the guide bush 6. When the leading edge of the foremost large diameter spool section 3b reaches a vertical height, previously memorized, which is almost equal to the guide height of the top surface of the guide bush 6 from a standard level, the microcomputer of the electronic control unit (ECU) 34 memorizes the vertical position of the robot hand 20 as an original or zero (0) position. At step S2, the robot hand 20 is continuously moved downward under specific conditions, applying a thrust force to the first half spool 3A. During the down movement of the robot hand 20, the inner force sensing device 22 monitors reactive force components Fx, Fy and Fz, the composed force of which is detected as a thrust force F applied to the first half spool 3A and provides a signal representative of the thrust force F for a decision as to whether it is larger than or equal to a first critical value f1, for instance approximately 100 gw, at step S3. If the answer to this decision is "YES," this indicates that abutment may be present between the leading edge of the foremost large diameter spool section 3b of first half spool 3A and the spherically chamfered edge A of the entry end opening of guide bush 6 at a point a1 as shown in FIG. 7A. Then, after down movement of the robot hand 20 has been immediately interrupted, it starts a corrective position adjustment by shifting the first half spool 3A in position in a horizontal plane in two dimensions, namely X and Y directions perpendicular to a vertical line, by specified minute distances at step S5. The robot hand 20 subsequently resumes its down movement at step S6. Based on a signal from the inner force sensing device 22 monitoring the reactive force thereto, a decision is made at step S7 as to whether the thrust force F applied to the first half spool 3A is equal to or smaller than a second critical value f2, for instance approximately 200 gw. If the answer to this decision is "NO," this indicates that the first half spool 3A may be brought out of precise coaxial alignment with the guide bore 6b of guide bush 6. Then, steps S4 through S7 are repeated until the answer "YES" is provided. A "YES" answer to the decision indicates that the first half spool 3A has been corrected in position so as to be in precise coaxial alignment with the guide bore 6b of guide bush 6.

On the other hand, if the answer to the decision made at step S3 is "NO," this indicates either that the first half spool 3A has been in precise coaxial alignment with the guide bore 6b of guide bush 6 or that the leading edge of the foremost large diameter spool section 3b of first half spool 3A has not yet reached the chamfered edge A of the entry opening of guide bush 6. Then, after the robot hand 20 has been immediately interrupted in down movement at step S8, a decision is made at step S9 as to whether the vertical descent distance D from the original position that the robot hand 20 has moved is equal to or larger than a first specified distance d1 (see FIG. 8). This decision is made based on an electric signal provided by a distance sensor (not shown), such as a potentiometer, in connection with the robot hand 20. If the answer to the decision made in step S9 is "YES," this indicates that the leading edge of the foremost large diameter spool section 3b of first half spool 3A has reached within the guide bore 6b of guide bush 6 with its center axis kept in alignment with the center axis of the guide bush 6. Then, then control proceeds to step S11 to continue the down movement of the robot hand 20. However, if the answer to the decision made at step S9 is "NO" this indicates that while the first half spool 3A is in coaxial alignment with the guide bore 6b of guide bush 6, the leading edge of the foremost large diameter spool section 3b of first half spool 3A has not yet moved into the guide bush 6. Then, at step S10, the robot hand 20 is forced to make a 1 mm downward movement at a speed higher than a speed at which it moves during step S2. This partial routine of steps S2, S3, S8, S9 and S10 is repeated until the robot hand 20 has moved the vertical descent distance D equal to the first specified distance d1 from the original position. In this instance, the number of times of allowable repetition of this partial routine is previously specified according to a tact time. The control is interrupted after the allowable number of repetitions of the routine has been reached.

Whenever it is confirmed that the thrust force F applied to the first half spool 3A is less than the second critical value f2 or the vertical descent distance D moved by the robot hand 20 moved from the original position is equal to or larger than the first specified distance d1, the robot hand 20 is continuously moved downward again under the specific conditions at step S11, so as to apply a thrust force to the first half spool 3A. During the down movement of the robot hand 20, the inner force sensing device 22 monitors reactive force components Fx, Fy and Fz as substitute components for the thrust force and provides a signal representative of the thrust force F. A decision is made at step S12 as to whether the thrust force F is equal to or larger than a third critical value f3, for instance approximately 500 gw. If the answer to this decision is "YES," it is judged that the first half spool 3A has supposedly been out of coaxial alignment with the guide bore 6b of guide bush 6 and interference has been caused due to inclination of the foremost large diameter spool section 3b with respect to the guide bore 6b. As a result, it is determined that the upper and/or lower edges of the foremost large diameter spool section 3b have gotten in contact with the wall surface of the guide bore 6b of guide bush 6 at points b1 and b2 as shown in FIG. 7B. Then, after the robot hand 20 has been immediately interrupted in down movement at step S13, it starts a corrective position adjustment in which the first half spool 3A is shifted in a horizontal plane in two dimensions, i.e. X and Y directions perpendicular to a vertical line, by specified minute distances at step S14. After the position adjustment, the robot hand 20 resumes its down movement again at step S15 and, on the basis of a signal from the power sensor 22, a decision is made at step S16 as to whether the thrust force F is equal to or smaller than the second critical value f2 of 200 gw. If the answer to this decision is "NO" the first half spool 3A is still out of precise coaxial alignment with the guide bore 6b of guide bush 6 and there is still interference between the opposite edges of the foremost large diameter spool section 3b and the wall surface of the guide bore 6b of guide bush 6 at points b1 and b2. Then, steps S13 through S16 are repeated so as to correct the position of the first half spool 3A with respect to the guide bush 6. A "YES" answer to the decision made at step S16 indicates that the first half spool 3A has been corrected in coaxial alignment with the guide bush 6.

On the other hand, if the answer to the decision made at step S12 is "NO," this indicates either that the first half spool 3A has been kept in precise coaxial alignment with the guide bore 6b of guide bush 6. Then, after the robot hand 20 has been immediately interrupted in down movement at step S17, a decision is made at step S9 as to whether the vertical descent distance D that the robot hand 20 has moved from the original position is equal to or larger than a second specified distance d1+d2 (see FIG. 8). If the answer to the decision made at step S9 is "YES," this indicates that the leading edge of the foremost large diameter spool section 3b of first half spool 3A has almost reached the bottom of the guide bush 6 with its center axis kept in coaxial alignment with the center axis of the guide bush 6. Then, the control proceeds to step S20 to continue the down movement of the robot hand 20. However, if the answer to the decision made at step S9 is "NO," the foremost large diameter spool section 3b of the first half spool 3A is still midway in the guide bush 6. Then, the robot hand 20 is forced to move 1 mm downward at a speed higher than a speed at which it moved during step S11. This routine of steps S11, S12, S17, S18 and S19 is repeated until the robot hand 20 has moved the vertical descent distance D equal to the second specified distance d1+d2 from the original position.

Whenever it is confirmed that the thrust force F applied to the first half spool 3A is less than the second critical value f2 of approximately 200 gw or that the vertical descent distance D that the robot hand 20 has moved from the original position is equal to or larger than the second specified distance d1+ d2, the robot hand 20 is continuously moved downward under the specific conditions at step S20, applying a thrust force to the first half spool 3A. During the down movement of the robot hand 20, a decision is made at step S21, from a signal representative of the reactive force monitored as a substitute for the thrust force F by the inner force sensing device 22, as to whether the thrust force F is equal to or larger than the third critical value f3 of approximately 500 gw. If the answer to this decision is "YES," the first half spool 3A has been brought out of coaxial alignment with the valve bore 2 and there is supposedly caused an impediment at a point c1 between the foremost large diameter spool section 3b of first half spool 3A and the inner edge C of the shoulder 2f between the large diameter bore section 2b and entry bore 2d as shown in FIG. 7C. Then, after the robot hand 20 has been immediately interrupted in down movement at step S22, it shifts the first half spool 3A in two dimensions, i.e. X and Y directions perpendicular relative to the vertical line, by specified minute distances for corrective position adjustment at step S23. After the position adjustment, the robot hand 20 resumes its down movement again at step S24 and, on the basis of a signal from the inner force sensing device 22, a decision is made at step S25 as to whether the thrust force F is equal to or smaller than the third critical value f3 of approximately 500 gw. If the answer to the decision made at sep S25 is "YES," the first half spool 3A has gotten over the interference between the foremost large diameter spool section 3b and the shoulder 2f and is aligned coaxially with and entered into the large diameter bore section 2b of main valve body 1A. Then, the robot hand 20 causes the spool chucking arm 28S to release the first half spool 3A at step S29 and moves upward to terminate the operation. When the first half spool 3A is released from the spool chucking arm 28S, it smoothly falls down into the bore 2 of main valve body 1A due to vibration. If the answer to the decision made at step S25 is "NO," this indicates that the foremost large diameter spool section 3b of first half spool 3A is still impeded by the shoulder 2f. Then, steps S22 through S25 are repeated so as to eliminate the impediment.

Further, if the answer to the decision made at step S21 is "NO," the first half spool 3A has been kept in precise coaxial alignment with the guide bore 6b of guide bush 6. Then, after the robot hand 20 has been immediately interrupted in down movement at step S26, a decision is made at step S28 as to whether the vertical descent distance D that the robot hand 20 has moved from the original position is equal to or larger than a third specified distance d1+ d2+d3 (see FIG. 8).

If the answer to the decision is "YES," this indicates that the leading edge of the foremost large diameter spool section 3b of first half spool 3A has entered into the large diameter bore section 2b with its center axis kept in coaxial alignment with the center axis of the large diameter bore section 2b. Then, the control proceeds to step S29 to release the first half spool 3A and ends. However, if the answer to the decision made at step S27 is "NO," this indicates that the foremost large diameter spool section 3b of first half spool 3A is still within the entry bore 2d. Then, the robot hand 20 is forced to move one (1) mm downward at a speed higher than a speed at which it moves during step S20. This partial routine of steps S20, S21, S26, S27 and S28 is repeated until the robot hand 20 has moved the vertical descent distance D from the original position equal to the third specified distance d1+d2+ d3.

As described above, the third critical value f3 for detecting the interference of the foremost large diameter spool section 3b of first half spool 3A with the wall surface of the guide bore 6b of guide bush 6 and for detecting the interference of the section 3b with the inner edge C of the shoulder 2f between the large diameter bore section 2b and entry bore 2d is larger than the first critical value f1 for detecting the abutment of the leading edge of the foremost large diameter spool section 3b of first half spool 3A against the spherically chamfered edge A of the entry end opening of guide bush 6. This makes the time necessary to complete assembling of the hydraulic control valve unit HCVU shorter. However, the third critical value f3 may be made smaller than the first critical value f1. In such a case, scratches on the wall surface of the valve bore 2 are reduced.

It is to be understood that although the present invention has been described with regard to a preferred embodiment thereof, various other embodiments and variants which are within the scope and spirit of the invention may occur to those skilled in the art. Such other embodiments and variants are intended to be covered by the following claims.

What is claimed is:

1. A method of assembling a mechanical unit including a body, formed with an axial bore having a plurality of cylindrical bore sections with different inner diameters and arranged coaxially in order of diameter, and a plunger-like rod, installed for sliding movement in said body, which has a plurality of cylindrical rod sections having different outer diameters, a largest diameter of said different outer diameters being approximately equal to a second largest diameter of said different inner diameters, said method comprising the steps of:

inserting a cylindrical guide bush, having an outer diameter approximately equal to a largest inner diameter of said different inner diameters and an inner diameter approximately equal to the second largest diameter of said different inner diameters, into said largest inner diameter of said different inner diameters;

coaxially aligning said largest diameter of said different outer diameters of said cylindrical rod sections of said plunger-like rod with said cylindrical guide bush;

forcing said plunger-like rod into said cylindrical guide bush and then into said body;

removing said cylindrical guide bush from said body; and closing said axial bore.

2. A method as defined in claim 1, and further comprising the step of placing a guide shoe in position for coaxially aligning said cylindrical guide bush with said second largest diameter of said different inner diameters and fixing said guide shoe in position before inserting said cylindrical guide bush into said largest inner diameter of said different inner diameters.

3. A method as defined in claim 1, and further comprising the steps of monitoring a thrust force with which said plunger-like rod is forced into said guide bush and then into said body and again coaxially aligning said largest diameter of said different outer diameters of said cylindrical rod sections of said plunger-like rod with respect to said cylindrical guide bush when said thrust force is larger than a predetermined value.

4. A method as defined in claim 3, wherein said predetermined value is larger for forcing said plunger-like rod into said cylindrical guide bush than for forcing said plunger-like rod into said body.

5. A method as defined in claim 3, and further comprising the step of again forcing said plunger-like rod into said cylindrical guide bush and said body when said thrust force is larger than a predetermined value.

6. A method as defined in claim 5, wherein said predetermined value is larger for forcing said plunger-like rod into said cylindrical guide bush than for forcing said plunger-like rod into said body.

7. A method of assembling a hydraulic control valve unit including a valve body formed with a plurality of cylindrical bore sections, forming a part of an axial valve bore, which have different inner diameters and are arranged coaxially in order of diameter, a cylindrical valve cap, formed with a plurality of cylindrical bore sections forming another part of said axial valve bore which have different inner diameters and are arranged coaxially, said cylindrical valve cap being fitted into a largest inner diameter of said different inner diameters so as to complete said axial valve bore, and a valve spool, having a plurality of cylindrical spool sections with different outer diameters, which is installed for sliding movement in said axial valve bore, a largest outer diameter of said different outer diameters being approximately equal to a second largest diameter of said different inner diameters, said assembling method comprising the steps of:

inserting a cylindrical guide bush, having an outer diameter approximately equal to a largest inner diameter of said different inner diameters and an inner diameter approximately equal to said second largest diameter of said different inner diameters, into said largest inner diameter of said different inner diameters;

coaxially aligning said largest outer diameter of said different outer diameters with said cylindrical guide bush;

forcing said valve spool into said cylindrical guide bush and then into said valve body;

removing said cylindrical guide bush from said valve body; and inserting said cylindrical valve cap into said valve body.

8. A method as defined in claim 7, and further comprising the steps of monitoring a thrust force with which said valve spool is forced into said cylindrical guide bush and then into said valve body, and coaxially aligning said largest outer diameter of said different outer diameters with respect to said cylindrical guide bush and forcing said valve spool into at least one of said cylindrical guide bush and said valve body again when said thrust force is larger than a predetermined value.

9. A method as defined in claim 8, wherein said predetermined value is established so as to be larger for forcing said valve spool into said cylindrical guide bush than for forcing said valve spool into said valve body.

* * * * *